US010459810B2

United States Patent
Amirishetty et al.

(10) Patent No.: US 10,459,810 B2
(45) Date of Patent: Oct. 29, 2019

(54) TECHNIQUE FOR HIGHER AVAILABILITY IN A MULTI-NODE SYSTEM USING REPLICATED LOCK INFORMATION TO DETERMINE A SET OF DATA BLOCKS FOR RECOVERY

(71) Applicant: Oracle International Corporation, Redwood Shores, CA (US)

(72) Inventors: Anjan Kumar Amirishetty, Fremont, CA (US); Yunrui Li, Fremont, CA (US); Tolga Yurek, Foster City, CA (US); Wilson Wai Shun Chan, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 109 days.

(21) Appl. No.: 15/643,294

(22) Filed: Jul. 6, 2017

(65) Prior Publication Data

US 2019/0012244 A1 Jan. 10, 2019

(51) Int. Cl.
*G06F 9/52* (2006.01)
*G06F 11/14* (2006.01)
(Continued)

(52) U.S. Cl.
CPC ...... *G06F 11/2023* (2013.01); *G06F 11/1471* (2013.01); *G06F 11/1474* (2013.01);
(Continued)

(58) Field of Classification Search
CPC ............. G06F 11/1471; G06F 11/1474; G06F 11/1658; G06F 11/1662; G06F 11/202; G06F 11/2023; G06F 11/2025; G06F 11/2043; G06F 11/2046; G06F 11/2097; G06F 16/2315; G06F 16/2322;
(Continued)

(56) References Cited

U.S. PATENT DOCUMENTS 3,964,029 A 6/1976 Babb
4,118,788 A 10/1978 Roberts
(Continued)

FOREIGN PATENT DOCUMENTS

EP 286807 A2 10/1988
WO WO9206440 4/1992

OTHER PUBLICATIONS

U.S. Appl. No. 11/540,038, filed Sep. 28, 2006, Office Action, dated Aug. 8, 2008.
(Continued)

*Primary Examiner* — Gabriel Chu
(74) *Attorney, Agent, or Firm* — Hickman Palermo Becker Bingham LLP

(57) ABSTRACT

Techniques are described herein for quick identification of a set of units of data for which recovery operations are to be performed to redo or undo changes made by the failed node. When a lock is requested by an instance, lock information for the lock request is replicated by another instance. If the instance fails, the other instance may use the replicated lock information to determine a set of data blocks for recovery operations. The set of data blocks is available in memory of a recovery instance when a given node fails, and does not have to be completely generated by scanning a redo log.

18 Claims, 4 Drawing Sheets

(51) Int. Cl.
*G06F 11/20* (2006.01)
*G06F 16/23* (2019.01)
*G06F 16/27* (2019.01)
*H04L 29/08* (2006.01)

(52) U.S. Cl.
CPC ........ *G06F 16/2336* (2019.01); *G06F 16/273* (2019.01); *G06F 9/52* (2013.01); *G06F 2201/825* (2013.01); *H04L 67/1097* (2013.01)

(58) Field of Classification Search
CPC ............. G06F 16/2329; G06F 16/2336; G06F 16/2343; G06F 16/2358; G06F 16/2368; G06F 16/273; G06F 9/52; G06F 2201/825; Y10S 707/99938
See application file for complete search history.

(56) References Cited

U.S. PATENT DOCUMENTS

| | | |
|---|---|---|
| 4,255,796 A | 3/1981 | Gabbe et al. |
| 4,435,766 A | 3/1984 | Haber et al. |
| 4,606,002 A | 8/1986 | Waisman et al. |
| 4,677,550 A | 6/1987 | Ferguson |
| 4,751,702 A * | 6/1988 | Beier .................. G06F 11/2097 707/999.202 |
| 4,769,772 A | 9/1988 | Dwyer |
| 4,774,657 A | 9/1988 | Anderson et al. |
| 4,811,199 A | 3/1989 | Kuechler et al. |
| 4,811,217 A | 3/1989 | Tokizane et al. |
| 4,814,971 A | 3/1989 | Thatte |
| 4,817,036 A | 3/1989 | Millett et al. |
| 4,827,462 A | 5/1989 | Flannagan et al. |
| 4,829,427 A | 5/1989 | Green |
| 4,945,475 A | 7/1990 | Bruffey et al. |
| 4,947,320 A | 8/1990 | Crus et al. |
| 4,956,774 A | 9/1990 | Shibamiya et al. |
| 5,043,872 A | 8/1991 | Cheng et al. |
| 5,060,144 A | 10/1991 | Sipple et al. |
| 5,091,852 A | 2/1992 | Tsuchida et al. |
| 5,161,227 A | 11/1992 | Dias et al. |
| 5,202,971 A | 4/1993 | Henson et al. |
| 5,237,678 A | 8/1993 | Kuechler et al. |
| 5,241,648 A | 8/1993 | Cheng et al. |
| 5,251,318 A | 10/1993 | Nitta et al. |
| 5,257,365 A | 10/1993 | Powers et al. |
| 5,285,528 A | 2/1994 | Hart |
| 5,287,521 A | 2/1994 | Nitta et al. |
| 5,325,525 A | 6/1994 | Shan |
| 5,339,427 A | 8/1994 | Elko |
| 5,394,531 A | 2/1995 | Smith |
| 5,398,199 A | 3/1995 | Lefons |
| 5,403,639 A | 4/1995 | Belsan et al. |
| 5,408,653 A | 4/1995 | Josten et al. |
| 5,410,697 A | 4/1995 | Baird et al. |
| 5,432,919 A | 7/1995 | Falcone et al. |
| 5,440,743 A | 8/1995 | Yokota et al. |
| 5,442,763 A | 8/1995 | Bartfai et al. |
| 5,452,447 A | 9/1995 | Nelson et al. |
| 5,454,108 A | 9/1995 | Devarakonda et al. |
| 5,511,178 A | 4/1996 | Takeda et al. |
| 5,551,027 A | 8/1996 | Choy et al. |
| 5,551,046 A | 8/1996 | Mohan et al. |
| 5,590,308 A | 12/1996 | Shih |
| 5,596,754 A | 1/1997 | Lomet |
| 5,612,865 A | 3/1997 | Dasgupta |
| 5,682,537 A | 10/1997 | Davies et al. |
| 5,689,255 A | 11/1997 | Frazier et al. |
| 5,761,659 A | 6/1998 | Bertoni et al. |
| 5,778,442 A | 7/1998 | Ezzat et al. |
| 5,845,318 A | 12/1998 | Rose et al. |
| 5,892,945 A | 4/1999 | Mirchandaney et al. |
| 5,893,086 A | 4/1999 | Schmuck et al. |
| 5,963,960 A | 10/1999 | Swart et al. |
| 5,963,963 A | 10/1999 | Schmuck et al. |
| 5,970,495 A | 10/1999 | Baru et al. |
| 5,987,506 A | 11/1999 | Carter et al. |
| 5,999,712 A | 12/1999 | Moiin et al. |
| 6,023,706 A | 2/2000 | Schmuck et al. |
| 6,026,394 A | 2/2000 | Tsuchida et al. |
| 6,026,474 A | 2/2000 | Carter et al. |
| 6,044,367 A | 3/2000 | Wolff |
| 6,047,283 A | 4/2000 | Braun |
| 6,052,697 A | 4/2000 | Bennett et al. |
| 6,101,495 A | 8/2000 | Tsuchida et al. |
| 6,144,983 A | 11/2000 | Klots et al. |
| 6,173,313 B1 | 1/2001 | Klots et al. |
| 6,185,601 B1 | 2/2001 | Wolff |
| 6,209,074 B1 | 3/2001 | Dell et al. |
| 6,226,651 B1 * | 5/2001 | Masuda ............. G06F 11/1471 |
| 6,253,273 B1 | 6/2001 | Blumenau |
| 6,292,795 B1 | 9/2001 | Peters et al. |
| 6,353,836 B1 | 3/2002 | Bamford et al. |
| 6,385,613 B1 | 5/2002 | Grewell et al. |
| 6,453,404 B1 | 9/2002 | Bereznyi et al. |
| 6,539,446 B1 * | 3/2003 | Chan ........................ G06F 9/52 710/200 |
| 6,668,295 B1 | 12/2003 | Chan |
| 6,708,198 B1 | 3/2004 | Simmons et al. |
| 6,751,616 B1 | 6/2004 | Chan |
| 6,915,387 B1 | 7/2005 | Huffman et al. |
| 6,920,454 B1 | 7/2005 | Chan |
| 6,973,549 B1 | 12/2005 | Testardi |
| 6,986,003 B1 | 1/2006 | Sipple et al. |
| 7,085,911 B2 | 8/2006 | Sachedina et al. |
| 7,173,929 B1 | 2/2007 | Testardi |
| 7,346,720 B2 | 3/2008 | Fachan |
| 7,702,660 B2 | 4/2010 | Chan et al. |
| 2003/0079155 A1 | 4/2003 | Kingsbury |
| 2003/0217068 A1 | 11/2003 | Fruchtman |
| 2004/0133573 A1 | 7/2004 | Miloushev et al. |
| 2004/0225742 A1 | 11/2004 | Loaiza et al. |
| 2005/0022047 A1 * | 1/2005 | Chandrasekaran .......................... G06F 16/2343 714/5.11 |
| 2005/0066064 A1 * | 3/2005 | Micheal .................. G06F 9/526 710/1 |
| 2005/0149540 A1 | 7/2005 | Chan et al. |
| 2005/0289143 A1 | 12/2005 | Oshri et al. |
| 2006/0101081 A1 | 5/2006 | Lin et al. |
| 2006/0206901 A1 | 9/2006 | Chan |
| 2006/0224805 A1 | 10/2006 | Pruscino et al. |
| 2006/0265414 A1 | 11/2006 | Loaiza et al. |
| 2006/0265420 A1 | 11/2006 | Macnaughton et al. |
| 2007/0174541 A1 * | 7/2007 | Chandrasekaran .......................... G06F 12/0817 711/100 |
| 2009/0217274 A1 * | 8/2009 | Corbin .................... G06F 9/466 718/101 |
| 2011/0060724 A1 * | 3/2011 | Chan .................. G06F 11/1469 707/683 |
| 2016/0077932 A1 * | 3/2016 | Chiu .................. G06F 11/2043 714/6.3 |
| 2018/0300204 A1 * | 10/2018 | Amirishetty ........ G06F 11/1469 |

OTHER PUBLICATIONS

U.S. Appl. No. 11/540,038, filed Sep. 28, 2006, Final Office Action, dated Mar. 2, 2010.
U.S. Appl. No. 11/540,038, filed Sep. 28, 2006, Interview Summary, dated Jan. 28, 2015.
U.S. Appl. No. 11/540,038, filed Sep. 28, 2006, Office Action, dated Jun. 25, 2014.
U.S. Appl. No. 11/540,038, filed Sep. 28, 2006, Advisory Action, dated Feb. 4, 2015
U.S. Appl. No. 11/540,038, filed Sep. 28, 2006, Final Office Action, dated Dec. 16, 2014.
U.S. Appl. No. 11/540,038, filed Sep. 28, 2006, Interview Summary, dated Nov. 13, 2014.
U.S. Appl. No. 11/638,058, filed Dec. 12, 2006, Office Action, dated Oct. 8, 2008.

(56) References Cited

OTHER PUBLICATIONS

U.S. Appl. No. 11/638,058, filed Dec. 12, 2006, Final Office Action, dated May 13, 2009.
U.S. Appl. No. 11/638,058, filed Dec. 12, 2006, Advisory Action, dated Jul. 27, 2009.
Bowen et al., "A Locking Facility for Parallel Systems", IBM Systems Journal, IBM Corp., vol. 36, No. 2, 1997, XP-000656510, ISSN: 0018-8670, 19 pages.
Nick, JM et al., "Overview of IBM system/390 parallel sysplex-a commercial parallel processing system", Parallel Processing Symposium, 1996, Proceedings of IPPS '96, IEEE, Apr. 1996, XP-010165009, 8 pages.
Nick, JM et al., "Parallel Sysplex: A Scalable, Highly Available, High Performance Commercial System", Journal of Parallel and Distributed Computing, vol. 43, No. 2, Jun. 15, 1997, XP-000696750, 10 pages.
Aldred et al., "A Distributed Lock Manager or Fault Tolerant MPP," IEEE, 1995, 3 pages.
Bhide, Anupam, "An Analysis of Three Transation Processing Architectures," Proceedings of the 14th VLDB Conference, Los Angeles, CA., 1988, 12 pages.
Copeland, George et al., "Data Placement in Bubba," ACM, Mar. 1988, 10 pages.
Corba, "Corbaservices: Common Object Services Specification.", 15 pages.
Dewitt, David J. et al, "A Performance Analysis of the Gamma Database Machine",: ACM, Mar. 1998, 33 pages.
Englert, Susanne, "A Benchmark of NonStop SQL Release 2 Demonstrating Near-Linear Speedup and Scaleup on Large Databases,", 29 pages.
Hermannsson, G., "Fast Locks in Distributed Shared Memory Systems," System Sciences, 1994, vol. 1: Architecture, Proceedings of the Twenty-Seventh Hawaii International Conference., (abstract only)., 11 pages.
Hong Wei et al., "Optimization of Parallel Query Execution Plans in XPRS," IEEE, Apr. 1991, 9 pages.
Molesky, Lory D. et al., "Database Locking Protocols for Large-Scale Cache-Coherent Shared Memory Multiprocessors: Design, Implementation and Performance," Jun. 6, 1995, pp. 1-24.
Molesky, Lory D et al., "Efficient Locking for Shared Memory Database Systems," Mar. 1994, 28 pages.
Rahm, Erhard, "Concurrency and Coherency Control in Database Sharing Systems," Technical Report ZRI, Dec. 1991, revised Mar. 1993, pp. 1-62.
Tenenbaum, Andrew S., "Structured Computer Organization, second Edition," Prentice-Hall Inc., Copyright 1984, pp. 10-12.
Stonebaraker, Michael et al., "The Design of XPRS," Proceeding of the 14th VLDB Conference, Los Angeles, CA., 1988, 17 pages.
The Tandem Performance Group, "A Benchmark of NonStop SQL on the Debit Credit Transaction," ACM, Mar. 1988, 21 pages.
Oracle8™ Parallel Server, "Concepts & Administration", Release 8.0, Nov. 14, 1997, Part No. A58238-01, 3 pgs.

* cited by examiner

TECHNIQUE FOR HIGHER AVAILABILITY IN A MULTI-NODE SYSTEM USING REPLICATED LOCK INFORMATION TO DETERMINE A SET OF DATA BLOCKS FOR RECOVERY

CROSS-REFERENCE TO RELATED APPLICATIONS

This application is related to application Ser. No. 11/638,058, filed Dec. 12, 2006, and to application Ser. No. 11/540,038, filed Sep. 28, 2006, the entire contents of which are hereby incorporated by reference as if fully set forth herein.

FIELD OF THE INVENTION

The present invention relates to multi-node database systems, and in particular, maintaining availability during a failure of the multi-node database system.

BACKGROUND

In a clustered database system, multiple "nodes" may have access to the same on-disk copy of a database. Typically, each node is a computing device with its own local memory and processors that are running one or more database instances. The database server instances on each of the nodes may request access to the database in order to read or modify database data.

If a node fails, one or more of the surviving nodes performs failure recovery. In a database system, this may entail redoing or undoing certain changes to the database system. A redo log is scanned to determine which changes need to be redone or undone and how to redo or undo the changes.

A redo log contains redo records. Redo records record changes to a unit of data in a database (e.g. a row, a data block that stores rows) A redo record contains enough information to reproduce a change between a version of the unit of data previous to a change and a version of the unit of data subsequent to the change.

During failure recovery, much of the database is locked. Normal access to the database by the surviving nodes is prevented until it can be determined which units of data have changes that may need to redone or undone. Once this set is determined, the database is unlocked and normal access to unit of data that are not in the set is permitted.

Because the database is locked until the completion of the process of determining the set of units of data that have changes that need to be redone or undone, the completion of this process delays the full availability of the database system. Constant and complete availability of a database system is a critical feature of a multi-node database system. Therefore, there is a need to reduce the time is takes to determine the set of units of data that have changes to be redone or undone.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Described herein is an approach that enables, in the event of a failure of a node in a multi-node system, the quick identification of a set of units of data for which recovery operations are to be performed to redo or undo changes made by the failed node. According to an embodiment, the units of data are data blocks in a database.

In an embodiment, an instance stores a plurality of replicated lock information. When a lock is requested by another instance, lock information for the lock request is asynchronously replicated by the instance. The lock information includes a target resource object of the lock request. The target resource object may be data indicating one or more data blocks that comprise the target resource object.

Each instance may be assigned as a recovery instance for another instance, to perform failure recovery when the other instance fails. In an embodiment, if the other instance fails, the instance may use the replicated lock information to determine a set of data blocks for recovery operations. The set of data blocks is available in memory of a recovery instance when a given node fails, and does not have to be completely generated by scanning a redo log, allowing the database to be made available more quickly.

System Overview

Figure 1:
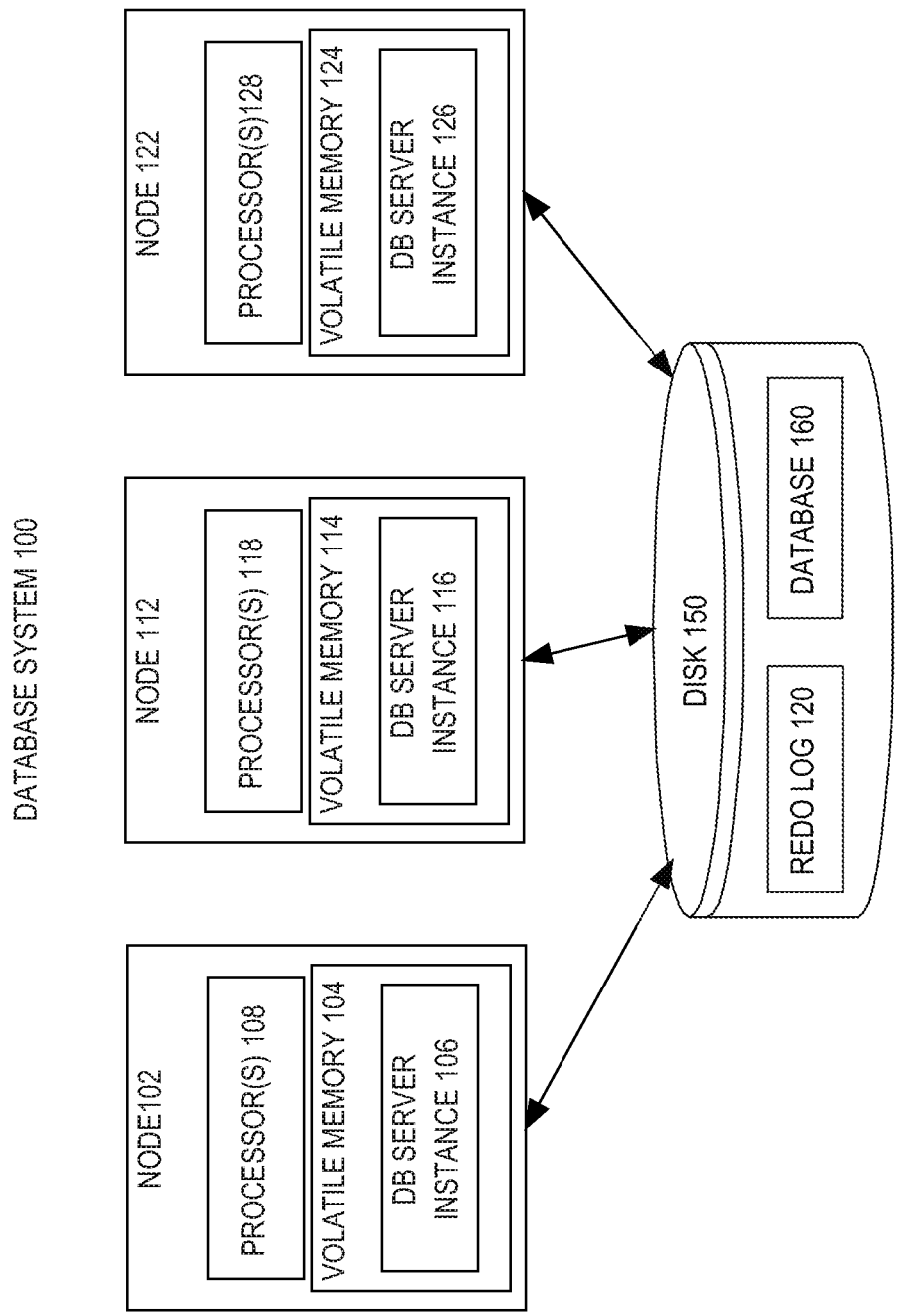
FIG. 1 is a block diagram illustrating a multi-node database system.

FIG. 1 shows a multi-node database system that may be used to implement an embodiment of the present invention. Referring to FIG. 1, it shows multi-node DBMS 100, which comprises nodes 102, 112, and 122. Although three nodes are shown in the present illustration, in other embodiments, DBMS 100 may comprise more or fewer nodes.

Nodes 102, 112, and 122 have access to the same database 160. For the purpose of illustration, database 110 is shown as stored on a single shared disk 150, but in alternative embodiments may be spread across multiple disks to which each of nodes 102, 112, and 122 have access.

Nodes 102, 112, and 122 respectively have one or more processors 108, 118, and 128, and local RAM memory 104, 114, and 124. In addition, nodes 102, 112, and 122 are respectively executing database server instances 106, 116, and 126. Each of database server instances 106, 116, and 126 manage access to database 110. While in the illustrated embodiment each node is executing a single database server instance, in alternative embodiments, a single node may execute more than one database server instance.

Instances 106, 116, and 126 record changes to database 160 by generating redo log records and storing them in redo log 120. Redo log records include redo records and other kinds of records for supporting failure recovery, transaction processing and/or other functions, as shall be described in further detail. According to an embodiment, a redo record records a change to data block. Redo log records are ordered sequentially within redo log 120. In an embodiment, redo log 120 comprises a plurality of redo log files, wherein each instance is associated with one or more particular redo log files of the plurality of redo log files. That is, each redo log file includes changes made by a particular instance. In other embodiments, a plurality of instances may share one or more redo log files.

In an embodiment, the redo records are each associated with a system change number (SCN) and the redo records are ordered within a redo log according to the SCNs associated with the redo record. SCNs reflect an order of the events within a DBMS, such events including a beginning of a transaction, a change to data block made by a transaction, and a commit of the transaction. For example, when a particular transaction begins, the current SCN of the primary database may be at "1." When the particular transaction makes a particular change, the current SCN may advance to "2." When the particular transaction commits, the current SCN may advance to "3." A SCN may represent a logical time that corresponds to a particular state of the primary database. While an embodiment is illustrated herein based on redo records that record changes to data blocks, an embodiment of the present invention may be based on redo records that record changes to any type of unit of data in a database.

Database Transactions

DBMS 100 is transaction-oriented. A transaction is a logical unit of work that is performed as an atomic unit. In the context of database systems, the database must reflect all the changes made by a transaction, or none of the changes made by the transaction to ensure the integrity of the database. Consequently, none of the changes made by a transaction are permanently applied to a database until the transaction has been fully executed. A transaction is said to "commit" when the changes made by the transaction are made permanent. A transaction is active if the transaction has not been committed, aborted, or otherwise terminated.

In order for a transaction to make a change to a row, the data block for that row is loaded into a buffer in memory of a node, such as memory 104, 114, and 124. The in-memory version of the data block ("buffered data block") is changed and a redo record recording the change is generated. The redo record and the data block, as changed, are eventually written into persistent storage. Normally, the redo record is written to persistent storage before the changed buffered data block. A buffered data block that has been changed and not stored persistently since changed is referred to as being dirty with respect to that change.

Through a process referred to herein as checkpointing, dirty data blocks of a database server are written to persistent storage and a checkpoint record is written to the redo log. For any redo record before the latest checkpoint, the data block with the changes recorded by the redo record has been written to persistent storage and is no longer dirty (at least with respect to any changes for any redo record preceding the checkpoint record). For any redo records occurring after the checkpoint, the corresponding changed data block may or may not have been written to persistent storage. The redo log records occurring in the redo log before a checkpoint record are referred to herein as being checkpointed.

During failure recovery processing, recovery operations are performed on data blocks that may be dirty. These set of data blocks are referred to herein as the recovery set. In general, before recovery operations are commenced for the recovery set, the recovery set is determined (an operation referred to herein as "recovery set determination") and write locks are obtained on the set's members (an operation referred to herein as "recovery set lock out"). The database is locked until completion of the recovery set determination and lock out. After completion, the database is unlocked and data blocks that are not in the recovery set become available for normal operations e.g. for read operations to compute queries and updating by DML ("Data Manipulation Language") operations.

Lock Management

Lock management mechanisms manage concurrent access to shared resources in a multi-node system. One such mechanism is referred to herein as a multi-tiered lock system. In a multi-tiered lock system, for a given shared resource, one node in a multi-node computer system is the "master" of the resource and responsible for managing access to the shared resource. Shared resources for which a node is master are referred to as shared resources mastered by the node or, for convenience of expression, as being the shared resources of the master. A shared resource may be, for example, data blocks of disk 150 on which portions of database 160 are stored.

The master globally manages concurrent access to a shared resource and maintains a global view of concurrent access by shared nodes to the shared resource. Access by processes in a multi-node system, whether the process is executing on the master or another node within the system, is controlled by the master of the resource. To gain access to a resource, a request must be made to the master of the resource, which may grant or deny the request. Processes on a node that is not the master (i.e. a "remote node") may not individually be granted access to a resource by a master node. Rather, a remote node is granted access to a resource, and once granted, the process on the remote node may access the resource.

A master node uses locks to manage access rights ("rights") to a resource. A lock is a data structure that indicates whether a particular entity has requested, been granted and holds a certain right to a resource. When a request for the right represented by a lock has been granted, the lock itself is referred to as being granted. Until the lock is relinquished, the lock is referred as being held.

In an embodiment, if an instance fails, its recovery instance performs instance recovery. Instance recovery includes three phases: scan, claim, and apply. The scan phase scans from a checkpoint, if any, to the end of the redo log to determine which blocks need recovery. The claim phase acquires the locks for the blocks that need recovery. The apply phase applies or undoes the changes made to those blocks by the failed instance.

Lock Replication

When an instance fails, in order to prevent surviving instances from making changes to blocks that need to be recovered, the database is locked until the recovery blocks are determined and the locks are acquired. To reduce the amount of time needed to determine the set of recovery blocks, lock information for an instance is replicated at another node. The node can determine the set of recovery blocks from the replicated lock information rather than reading from a redo log.

In an embodiment, when an instance is granted a lock after a lock request, the lock information is replicated on another node. The lock information may include a target resource object and a change number associated with the lock request.

The target resource object comprises one or more data units, such as data blocks, that were requested by the lock request. In an embodiment, the lock information includes data indicating the location of the target resource object. For example, the data may indicate a set of one or more file numbers or data blocks corresponding to the target resource.

The change number indicates an order in which the lock requests were created or received. In an embodiment, the change number is the system change number associated with the lock request. The system change number is also associated with the redo log record recording changes to the target resource object.

In an embodiment, each instance may be associated with a particular other instance, referred to herein as a recovery instance, that is assigned to replicate all lock information for the instance. For example, instance 116 may be assigned to replicate lock information for lock requests generated by instance 106, instance 126 may be assigned to replicate lock information for lock requests generated by instance 116, and instance 106 may be assigned to replicate lock information for lock requests generated by instance 126.

In other embodiments, each instance may be associated with a plurality of other instances. Lock information for the instance is replicated at each of the other instances. For example, instances 116 and 126 may be assigned to replicate lock information for lock requests generated by instance 106.

In an embodiment, if a node is added or removed from the multi-node system, the recovery instances assigned to each instance may be updated or changed. Referring to the above example, instance 106 on node 102 is assigned to replicate lock information for instance 126. If node 102 fails or is removed from system 100, then instance 116 may be assigned to replicate lock information for instance 126.

In an embodiment, the lock information is replicated asynchronously. As referred to herein, asynchronous replication means that the system does not wait for the recovery instance to finish storing the lock information before proceeding. That is, the lock manager sends the request to replicate lock information to the second node, but does not wait for a confirmation or response from the second node to continue performing other tasks. The first node may make changes to the target resource object before the lock information has been stored at the second node.

Figure 2:
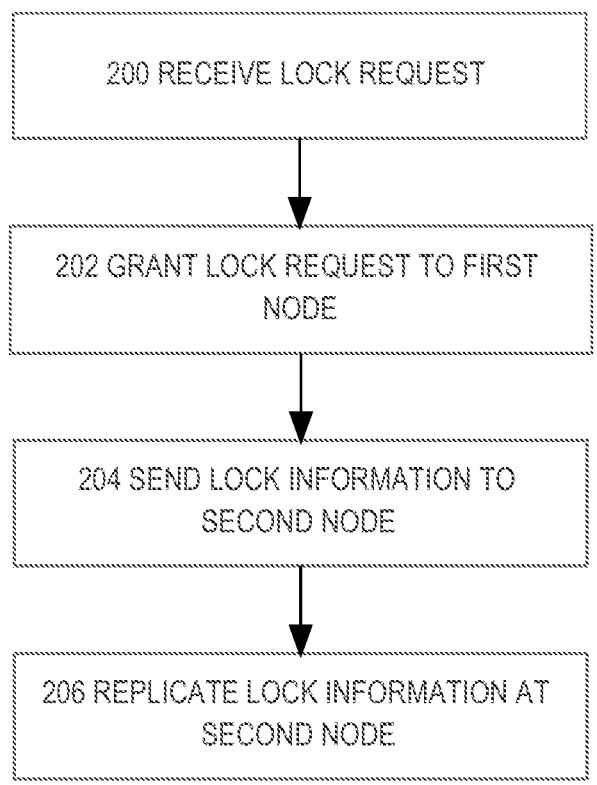
FIG. 2 is a flowchart illustrating steps for replicating lock information.

FIG. 2 illustrates an example process for replicating lock information. At step 200, a lock requested is generated by a first instance on a first node. For example, assume instance 106 on node 102 generates a lock request. The lock request is received by the lock manager. In an embodiment, the lock request includes a SCN corresponding to the lock request and a target resource object, or location information for the target resource object, that the instance is requesting a lock for.

At step 202, the lock manager grants the lock request to the first node. If the first node makes changes to the target resource object, the changes are recorded in a redo log for the first node. The redo record for the change may include the SCN corresponding to the lock request.

At step 204, the lock manager sends a request to replicate lock information to a second node. The request may include lock information for the lock request. In an embodiment, the lock information includes resource identification information for the target resource object and a change number associated with the lock request. In an embodiment, the lock manager sends the lock information asynchronously to the second node. The lock manager may send the request after granting the lock request or simultaneously with granting the lock request.

In an embodiment, to send lock information to the second node, the lock manager determines the recovery instance assigned to replicate lock information for the instance that issued the lock request. As an example, the DBMS may store information indicating, for each instance, which other instance is assigned as its recovery instance. The lock manager may use the information to determine which instance on which node to send the lock information to. Other embodiments may use other methods for determining which instance is the assigned recovery instance.

For example, instance 116 on node 112 is assigned to replicate lock information for instance 106. The lock manager determines that the instance 116 is replicating lock information and sends the lock information to instance 116.

At step 206, the lock information is stored at the second node. The second node may store the resource identification information in association with the change number. In an embodiment, the second node stores the lock information in its memory. For example, instance 116 may store lock information for instance 106 in memory 114.

In an embodiment, the recovery instance stores information indicating a maximum change number of a plurality of change numbers associated with lock information stored by the recovery instance. For the purpose of illustrating a clear example, each change number is a number. Instance 116 may receive three requests to store lock information, with change numbers "1,", "2," and "3." Instance 116 may store data indicating the maximum change number received is "3."

In an embodiment, the recovery instance stores information indicating a checkpoint that occurred for the instance whose lock information it's receiving. The recovery instance may store information indicating a change number of a latest checkpoint. In the current example, if instance 106 performs a checkpoint, the checkpoint may have a change number "4." The change number may be sent to instance 116. Instance 116 may store the checkpoint change number "4" in association with the checkpoint in memory 114.

Failure Recovery

When an instance fails, an instance storing its replicated lock information performs failure recovery for the failed instance. The instance performing failure recovery is referred to herein as the recovery instance. In an embodiment, a particular instance is assigned to replicate lock information for the failed node, and the particular instance is selected to be the recovery instance. In other embodiments, a plurality of instances may replicate lock information for the failed node, and a particular instance is selected from the plurality of instances to be the recovery instance.

The recovery instance determines a set of data blocks to recover. In an embodiment, the set of data blocks to recover comprises data blocks that have been modified by the failed instance. If the failed instance had checkpointed, then the set of data blocks to recover comprises data blocks that were modified after the checkpoint occurred.

As lock information is stored asynchronously, not all lock information may be replicated at the recovery instance before an instance fails. In an embodiment, the recovery instance determines a first set of data blocks to recover based on the replicated lock information. The first set of data block may comprise data blocks for lock requests up to a maximum change number. The recovery instance may determine a second set of data blocks to recover by scanning the redo log.

In an embodiment, the second set of data blocks include data blocks that were modified whose lock information had not been stored by the recovery instance. The recovery instance scans the redo log for the instance, starting from the record corresponding to the maximum change number, until the end of the redo log. For each redo record scanned, the data blocks indicated by the redo record are added to the second set of data blocks. The set of data blocks to recover include the first set of data blocks, determined based on the replicated lock information, and the second set of data blocks, determined from the redo log. Obtaining a recovery set based, at least in part, on lock information stored in memory of a node is faster than determining the recovery set by reading from a redo log or from lock information that is stored on disk.

If all lock information had been replicated by the recovery instance, then the recovery instance does not scan from the redo log. That is, if the replicated lock information is up to date, then the first set of data blocks includes all modified data blocks.

Figure 3:
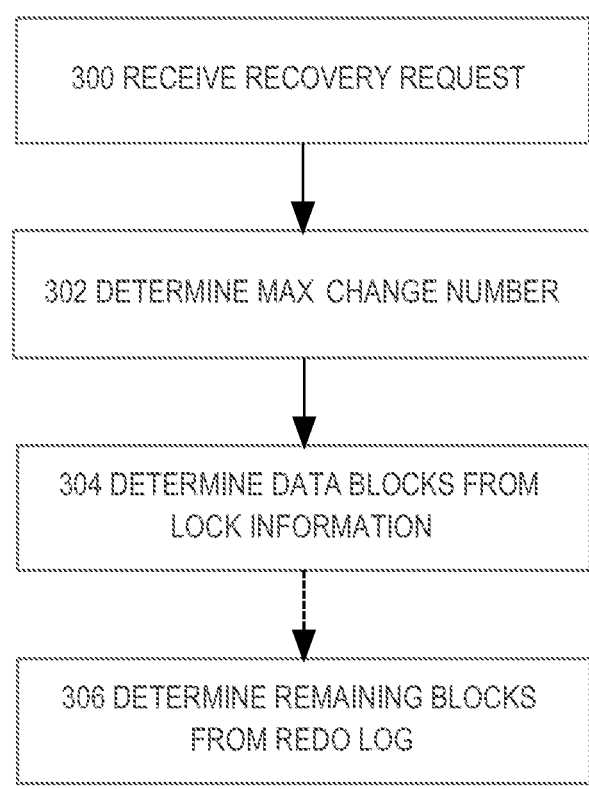
FIG. 3 is a flowchart illustrating steps for determining recovery data blocks using replicated lock information.

FIG. 3 illustrates an example process for determining a set of recovery blocks based on replicated lock information when an instance fails.

At step 300, a node receives a request to perform failure recovery. The node may receive the request in response to the DBMS determining that another node failed. The DBMS may determine that an instance on the node was assigned to replicate lock information for the failed node and indicate to the instance that it should perform failure recovery.

As an example, assume lock information for instance 106 on node 102 is replicated by instance 116 on node 112. If node 102 fails, instance 116 may receive a request to perform failure recovery for instance 106.

At step 302, the recovery instance determines a maximum change number. The maximum change number is the highest change number for the plurality of lock information stored at the node. In an embodiment, the recovery instance stores data indicating the maximum change number. In other embodiments, the recovery instance calculates the maximum change number based on the plurality of replicated lock information. In the above example, assume instance 116 is storing lock information for six lock requests, with change numbers "1," "2," "3," "4," "5," and "6." Instance 116 determines that the maximum change number is "6."

At step 304, the recovery instance determines a set of data blocks based on the plurality of replicated lock information and the maximum change number. In an embodiment, the recovery instance determines the set of data blocks by determining, for each replicated lock information, a set of one or more data blocks of the target resource object. In the above example, the set of data blocks comprises target data blocks for the lock request with change number "1," target data blocks for the lock request with change number "2," and so on, through change number "6."

In an embodiment, if the failed instance performed a checkpoint, the recovery instance may store data indicating a checkpoint change number. Determining the set of data blocks based on replicated lock information may be based on the checkpoint change number. In an embodiment, the set of data blocks to recover includes only data blocks that were modified after the checkpoint. The recovery instance determines the set of data blocks by determining, for each replicated lock information with a change number after the checkpoint change number, one or more data blocks of the target resource object.

In the present example, assume change number "4" corresponds to a checkpoint. The set of data blocks comprises target data blocks for the lock requests with change number "5" and change number "6." The changes to data blocks for the lock requests with change numbers "1" through "3" were already applied, so those data blocks are not included in the recovery set.

At step 306, the recovery instance determines zero or more remaining data blocks to recover based on the redo log. In an embodiment, the recovery instance scans redo records from the redo log based on the maximum change number determined at step 302.

If the maximum change number corresponds to the latest entry in the redo log of the failed instance, then no redo records are read. In other words, if the maximum change number corresponds to the change number of the latest redo record, then the replicated lock information is up to date. No additional data blocks need to be added to the set of recovery data blocks.

If the maximum change number is less than the change number of the latest redo record, then the recovery instance reads each redo record from the maximum change number to the end of the redo log for the failed instance. Each redo log entry may identify one or more data blocks of a target resource object. The one or more data blocks are added to the set of recovery data blocks.

For example, assume the redo log includes eight redo records, corresponding to change numbers "1" through "8." The maximum change number stored at the recovery instance is "6." Thus, the recovery instance reads the redo record with change number "7" and the redo record with change number "8." The sets of data blocks associated with each redo record are added to the set of recovery data blocks.

Once the set of data blocks needed for recovery are determined, the recovery instance can request a lock for each data block in the set. The recovery instance undoes or redoes the changes made to each data block.

When multiple instances fail, a particular instance may be selected to perform multi-instance failure recovery. In an embodiment, each instance is assigned a particular other instance to replicate its lock information. When multiple instances fail, an instance that has lock information for one of the failed instances is selected to be the recovery instance. In other embodiments, each instance is assigned a plurality of instances to replicate its lock information. When multiple instances fail, lock information for each failed instance may be replicated at a plurality of instances. The instance that has lock information for the greatest number of failed instances is selected to be the recovery instance.

The recovery instance determines, for each failed instance, the set of data blocks to recover. If the recovery instance stored replicated lock information for a particular failed instance, then the recovery instance determines the set of recovery data blocks as described above. If the recovery instance does not have lock information for a particular failed instance, it scans the redo records of the particular failed instance to determine the set of data blocks to recovery for the particular failed instance.

DBMS Overview

Embodiments of the present invention are used in the context of DBMSs. Therefore, a description of a DBMS is useful.

A DBMS manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

A database block, also referred to as a data block, is a unit of persistent storage. A database block is used by a database server to store database records (e.g., to store rows of a table, to store column values of a column). When records are read from persistent storage, a database block containing the record is copied into a database block buffer in RAM memory of a database server. A database block usually contains multiple rows, and control and formatting information, (e.g., offsets to sequences of bytes representing rows or other data structures, list of transactions affecting a row). A database block may be referenced by a database block address (DBA).

A database block is referred to as being atomic because, at least in part, a database block is the smallest unit of database data a database server may request from a persistent storage device. For example, when a database server seeks a row that is stored in a database block, the database server may only read the row from persistent storage by reading in the entire database block.

A multi-node database management system is made up of interconnected nodes that share access to the same database or databases. Typically, the nodes are interconnected via a network and share access, in varying degrees, to shared storage, e.g. shared access to a set of disk drives and data blocks stored thereon. The varying degrees of shared access between the nodes may include shared nothing, shared everything, exclusive access to database partitions by node, or some combination thereof. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computation resources being dedicated to performing a particular function on behalf of one or more clients. Resources from multiple nodes in a multi-node database system can be allocated to running a particular database server's software. Each combination of the software and allocation of resources from a node is a server that is referred to herein as a "server instance." A database server may comprise multiple database instances Hardware Overview According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
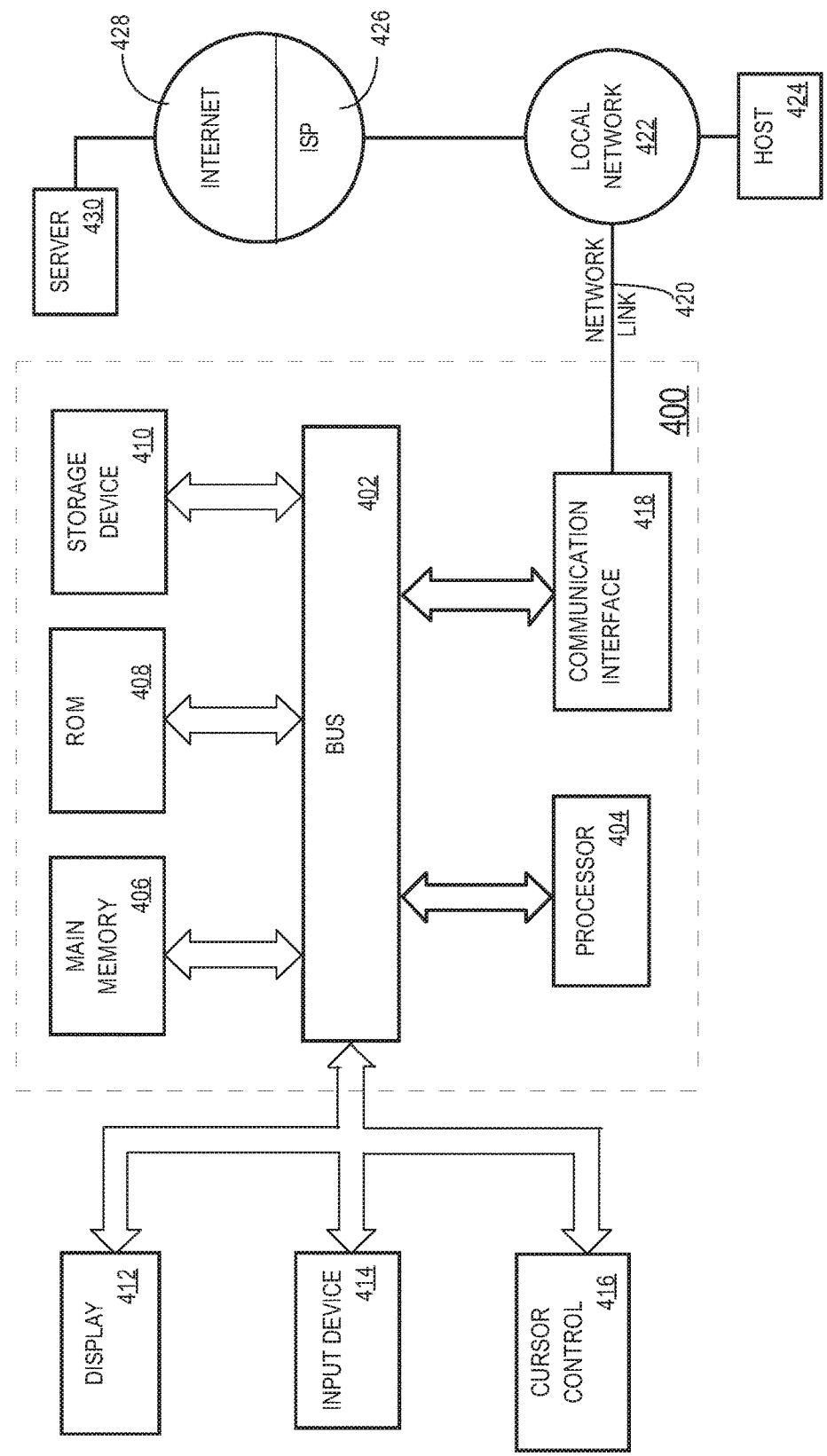
FIG. 4 is a block diagram illustrating a computer system that may be used to implement the techniques described herein.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   generating, at a first node of a multi-node database system, a plurality of lock requests;
   for each lock request of the plurality of lock requests:
      storing, in a redo log associated with the first node, changes to a target data block and a change number associated with the changes;
      receiving, at a second node of the multi-node database system, a request to replicate lock information for the lock request; and
      storing, in a memory of the second node, the change number and a location of the target data block.

2. The method of claim 1 wherein only the second node is assigned to replicate lock information for the first node.

3. The method of claim 1 wherein a plurality of nodes are assigned to replicate lock information for the first node, and the plurality of nodes includes the second node.

4. The method of claim 1 further comprising sending the request to replicate lock information asynchronously to the second node.

5. The method of claim 1 further comprising:
   in response to a failure of the first node, sending a recovery request to the second node;
   determining at the second node, based on replicated lock information, a set of one or more data blocks to recover, wherein said replicated lock information includes replicated lock information for a plurality of lock requests.

6. The method of claim 5, wherein determining the set of one or more data blocks comprises:
   determining a maximum change number among a plurality of change numbers associated with the replicated lock information;
   reading from the memory of the second node to determine a first set of one or more data blocks;
   based on the maximum change number, reading from the redo log to determine a second set of one or more data blocks;
   wherein the set of one or more data blocks to recover includes the first set and the second set.

7. The method of claim 6 further comprising:
   storing, at the second node, data indicating a maximum change number;
   wherein determining the maximum change number comprises reading the data indicating the maximum change number.

8. The method of claim 5, wherein determining the set of one or more data blocks comprises:

determining a checkpoint change number associated with the first node;
based on the checkpoint change number, reading from the memory of the second node to determine a first set of one or more data blocks;
reading from the redo log to determine a second set of one or more data blocks;
wherein the set of one or more data blocks to recover includes the first set and the second set.

9. The method of claim 8 further comprising:
storing, at the second node, data indicating a checkpoint change number;
wherein determining the checkpoint change number comprises reading the data indicating the checkpoint change number.

10. One or more non-transitory computer-readable media storing one or more sequences of instructions which, when executed by one or more processors, cause performing of:
generating, at a first node of a multi-node database system, a plurality of lock requests;
for each lock request of the plurality of lock requests:
storing, in a redo log associated with the first node, changes to a target data block and a change number associated with the changes;
receiving, at a second node of the multi-node database system, a request to replicate lock information for the lock request; and
storing, in a memory of the second node, the change number and the target data block.

11. The one or more non-transitory computer-readable media of claim 10 wherein only the second node is assigned to replicate lock information for the first node.

12. The one or more non-transitory computer-readable media of claim 10 wherein a plurality of nodes are assigned to replicate lock information for the first node, and the plurality of nodes includes the second node.

13. The one or more non-transitory computer-readable media of claim 10 wherein the one or more non-transitory computer-readable media store instructions which, when executed by the one or more processors, further cause sending the request to replicate lock information asynchronously to the second node.

14. The one or more non-transitory computer-readable media of claim 10 wherein the one or more non-transitory computer-readable media store instructions which, when executed by the one or more processors, further cause:
in response to a failure of the first node, sending a recovery request to the second node;
determining at the second node, based on replicated lock information, a set of one or more data blocks to recover, wherein said replicated lock information includes replicated lock information for a plurality of lock requests.

15. The one or more non-transitory computer-readable media of claim 14, wherein
determining the set of one or more data blocks comprises:
determining a maximum change number among a plurality of change numbers associated with the replicated lock information;
reading from the memory of the second node to determine a first set of one or more data blocks;
based on the maximum change number, reading from the redo log to determine a second set of one or more data blocks;
wherein the set of one or more data blocks to recover includes the first set and the second set.

16. The one or more non-transitory computer-readable media of claim 15 wherein the one or more non-transitory computer-readable media store instructions which, when executed by the one or more processors, further cause:
storing, at the second node, data indicating a maximum change number;
wherein determining the maximum change number comprises reading the data indicating the maximum change number.

17. The one or more non-transitory computer-readable media of claim 14, wherein
determining the set of one or more data blocks comprises:
determining a checkpoint change number associated with the first node;
based on the checkpoint change number, reading from the memory of the second node to determine a first set of one or more data blocks;
reading from the redo log to determine a second set of one or more data blocks;
wherein the set of one or more data blocks to recover includes the first set and the second set.

18. The one or more non-transitory computer-readable media of claim 17 wherein the one or more non-transitory computer-readable media store instructions which, when executed by the one or more processors, further cause:
storing, at the second node, data indicating a checkpoint change number;
wherein determining the checkpoint change number comprises reading the data indicating the checkpoint change number.

* * * * *